3,547,941
PROCESS FOR PREPARING 2-(2'-AMINOPHENYL)-
2,1,3-BENZOTRIAZOLES
Josef Pikl, Glassboro, N.J., assignor to E. I. du Pont de Nemours and Company, Wilmington, Del., a corporation of Delaware
No Drawing. Filed Aug. 30, 1966, Ser. No. 575,973
Int. Cl. C07d 55/04
U.S. Cl. 260—308                 12 Claims

ABSTRACT OF THE DISCLOSURE

This invention relates to a process for the manufacture of 2-(2'-aminophenyl)-2,1,3-benzotriazoles by reacting a 2,2' - dihalo-azo-, -azoxy- or -hydrazo-benzene with ammonia.

BACKGROUND OF THE INVENTION

In recent years there has been increased interest in 2-phenyl-2,1,3-benzotriazole and its derivatives as intermediates for azo dyes, photostabilizers and optical brighteners. One of the methods used to prepare such compounds is that of oxidative triazolation of o-aminoazobenzenes such as 2,2'-diaminoazobenzene with copper sulfate in a nitrogen containing solvent. However, these 2,2'-aminoazobenzenes are relatively expensive and difficult to obtain in a pure state.

In U.S. Pat. 3,148,179, R. A. Carboni describes the preparation of 2 - (2'-aminophenyl)-2,1,3-benzotriazole by reacting 2,2'-diaminoazobenzene with pyridine in the presence of anhydrous cupric sulfate at steam bath temperatures. The crude product is poured into ice water, extracted with ether, decolorized with activated carbon, dried over anhydrous sodium sulfate, evaporated to dryness and cooled to give a 62% yield of the desired product.

DESCRIPTION OF THE INVENTION

Quite surprisingly, it has now been discovered that 2-(2' - aminophenyl)-2,1,3-benzotriazoles can be prepared from 2,2'-dihalo-azo-, -hydrazo- or -azoxy-benzenes by the process which comprises reacting a dihalo-compound of the formula:

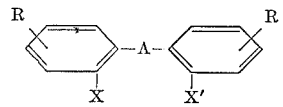

wherein A is an azo, hydrazo or azoxy group; X and X' are fluorine, chlorine, bromine or iodine and both R's are hydrogen or methyl, with at least about 4 moles of ammonia per mole of dihalo-compound at a temperature of at least about 100° C. The product will be an aminophenylbenzotriazole of the formula

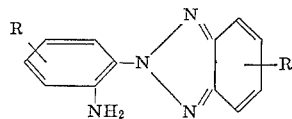

in which R is as described above. Under the preferred conditions of this process, yields of the order of about 73% can be obtained.

It is quite surprising that in accordance with the process of this invention, 2-(2'-aminophenyl)-2,1,3-benzotriazoles can be obtained directly from the easily prepared, low cost 2,2'-dihalo-azo, -hydrazo- and -azoxy-benzenes. One would expect the cyclization reaction of this invention to proceed with the intermediate formation of 2,2'-diaminoazobenzene, which is the starting material of the process of the Carboni patent. However, such is not the case. In fact, if 2,2'-diaminoazobenzene is used as the starting material in the process of this invention, considerably reduced amounts of the desired benzotriazole are obtained, in spite of the apparent "nearness" of the diaminoazobenzene to the desired benzotriazole product. In accordance with this invention, reaction with the 2,2'-dihalo-compound proceeds with concomitant formation of some o-aminoazobenzene and 2-phenylbenzotriazole. These side-products are not observed to any significant extent when diaminoazobenzene is used as the starting material. It is also unexpected that 2 - (2' - aminophenyl)2,1,3-benzotriazole forms regardless of the oxidation state of the starting dihalo-derivative, that is, hydrazo, azo or azoxy. In the process of the Carboni patent, no reaction takes place when, for example, diaminoazoxybenzene is used.

The 2,2' - dichloro-azo, -hydrazo-, or -azoxy-benzene starting material of this invention is easily prepared from o-chloronitrobenzene by known procedures, for example by catalytic hydrogenation as described in U.S. Pat. 3,156,-724 and Berichte 62, 1458 (1929). Thus, the present invention provides an efficient and economical route to 2-(2'-aminophenyl)-2,1,3-benzotriazoles using as the starting material, o-chloronitrobenzene which is inexpensive and readily available in abundant quantities.

In accordance with this invention the 2,2'-dihalo-azo-, -hydrazo- or -azoxy-benzene starting material is heated with ammonia, or a compound which gives ammonia in situ on heating, at a temperature of at least about 100° C. to form the desired amino-substituted phenylbenzotriazole. Preferably, the reaction is carried out at about 150° to 230° C. and most preferably at about 170° to 200° C. Generally, temperatures in excess of about 250° C. should be avoided, although they may be employed in combination with extremely short reaction times, if desired. When the reaction is completed, the reaction mass is cooled and the product is filtered and, if desired, recrystallized.

The reaction may be carried out at atmospheric pressure, especially when using an ammonia-generating compound, or under autogenous pressure in a corrosion resistant reaction vessel, such as stainless steel, Hastelloy C or Inconel.

The 2,2'-dihalo-compound reactants within the scope of this invention are of the formula:

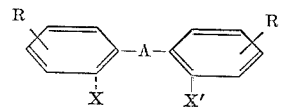

where A is an azo, hydrazo or azoxy group, X and X' are fluorine, chlorine, bromine, or iodine, and both R's are hydrogen or methyl. Representative compounds include 2,2'-difluoroazobenzene, 2,2'-dichloroazobenzene, 2,2'-dibromoazobenzene, 2,2'-diiodoazobenzene, 2-chloro-2'-bromoazobenzene, 2,2'-difluorohydrazobenzene, 2,2'-dichlorohydrazobenzene, 2,2' - dibromohydrazobenzene, 2,2'-diiodohydrazobenzene, 2-chloro-2-bromohydrazobenzene, 2,2'-difluoroazoxybenzene, 2,2'-dichlorozaoxybenzene, 2,2' - dibromoazoxybenzene, 2,2' - diiodoazoxybenzene, 2-chloro-2'-bromoazoxybenzene, 2,2'-dichloro-3,3'-dimethylazobenzene, 2,2' - dichloro-4,4'-dimethylazobenzene, 2,2'-difluoro-5,5'-dimethylazobenzene, 2,2'-dichloro-5,5'-dimethylazobenzene, 2,2'-dibromo-5,5'-dimethylazobenzene, 2,2'-diiodo-5,5'-dimethylazobenzene, 2-chloro-2'-bromo-5,5'-dimethylazobenzene, 2,2' - dichloro-6,6'-dimethylazobenzene, 2,2'-dichloro-3,3'-dimethylhydrazobenzene, 2,2'-dichloro-4,4'-dimethylhydrazobenzene, 2,2'-dichloro-5,5'-dimethylhydrazobenzene, 2,2' - dibromo-5,5'-dimethylhydrazobenzene, 2,2' - dichloro-6,6'-dimethylhydrazobenzene, 2,2' - dichloro-3,3'-dimethylazoxybenzene, 2,2'-dichloro - 4,4' - dimethylazoxybenzene, 2,2'-dichloro-5,5'-dimethylazoxybenzene, 2,2'-dibromo - 5,5' - dimethylazoxybenzene, and 2,2'-dichloro-6,6'-dimethylazoxybenzene.

At least about 4 moles of ammonia should be present for each mole of dihalo-compound used. Improved yields are obtained with increasing amounts of ammonia. An upper limit of about 150 moles of ammonia per mole of dihalo-compound is imposed by practical reactor volume utilization considerations. Preferably about 15 to 30 moles of ammonia per mole of dihalo-compound are employed. Although it is not essential that any water be present, ammonia in a concentration range of about 5 to 95% aqueous solution and preferably about 30 to 60% is generally used as the cyclizing agent. Ammonia is conveniently added as liquid anhydrous ammonia and sufficient water is added to provide the desired ammonia concentration. It is not essential that ammonia itself be added to the reaction. Other compounds such as urea which give ammonia in situ on heating may also be added. In that case, the ammonia-generating compound is added in sufficient amount to provide the desired amount of ammonia.

The cyclization reaction takes place without the aid of a catalyst, although the presence of a metal ion such as copper, cobalt, iron, chromium, manganese, vanadium or nickel favorably affects the yield. Such metal ion is provided in the reaction by introducing the metal in the form of its oxide, salt or chelate into the reaction vessel prior to heating.

Representative examples of suitable metal compounds include cupric oxide, cupric chloride, cupric sulfate, cuprous chloride, cobaltous chloride, chromium chloride, copper acetoacetate, cuprous cyanide, ferric chloride, manganous sulfate, manganese dioxide, vanadium pentoxide and nickel chloride. Cupric compounds are preferred. About 0.001 to 2.5 moles of metal ion per mole of the haloazobenzene compound are effective. Preferably about 0.1 to 2 moles of metal ion are employed per mole of the haloazobenzene compound.

It has also been found that the reaction is promoted by the presence of ammonium ions. A preferred embodiment includes the addition of ammonium chloride in amounts of about 0.5 to 6 moles per mole of haloazobenzene compound, and preferably about 1 to 3 moles. In many cases the reaction is also favorably influenced by the presence of an organic solvent such as phenol, ethylene glycol, isopropanol, formamide, acetamide, dimethylformamide, nitrobenzene, toluene, o-dichlorobenzene, ethanol or N-methylpyrrolidone.

The impure aminophenylbenzotriazole product obtained in accordance with this process may be purified by separating it from the phenylbenzotriazole and aminoazobenzene impurities. Separation from the phenylbenzotriazole may be accomplished by treating the product with a mineral acid such as hydrogen chloride or sulfuric acid to form the acid salt of the aminophenylbenzotriazole product. Preferably, the acid treatment is carried out in the presence of an inert organic solvent such as toluene which dissolves the phenylbenzotriazole impurity. When hydrochloric acid is used, it is convenient and preferable to pass anhydrous hydrogen chloride into the crude product solution. In the case of sulfuric acid, the product is preferably treated with an aqueous solution of about 8 to 20% by weight concentration. The acid salt of the aminophenylbenzotriazole is then separated by filtration and hydrolyzed in water.

The product can be separated from the aminoazobenzene impurity by treating with a metal reducing agent at elevated temperature to destroy the aminoazobenzene. The reducing step may be carried out before, simultaneously with, or after the acid treating step. When the reducing step is carried out during the acid treating step, reducing agents such as stannous chloride, titanium trichloride, titanous sulfate and iron are suitable at temperatures of about 80° to 100° C. When the reducing step is carried out before or after the acid treating step, reducing agents such as alkaline zinc or sodium hydrosulfite may be employed at temperatures of about 60° to 100° C. After the reducing step the desired product can be recovered by any suitable means such as filtration.

The following examples, illustrating the novel process for the preparation of 2-(2'-aminophenyl)-2,1,3-benzotriazoles and the novel purification processes disclosed herein, are given without any intention that the invention be limited thereto. All parts and percentages are by weight.

EXAMPLE 1

This example illustrates the preferred method of carrying out the process.

Into a stainless steel autoclave are charged 18.7 parts of 2,2'-dichloroazobenzene, 17.1 parts of cupric chloride hydrate, 60 parts of water, 31.5 parts of ammonium chloride and 90 parts of anhydrous ammonia. The autoclave is closed and heated for 6 hours at 180° C. The autogenous pressure developed is 1440 p.s.i. On cooling to room temperature, the ammonia is vented off and the solid reaction product is filtered and washed with water to give 15.3 parts of material. Vapor phase chromatographic analysis indicates that the product contains 74.5% 2-(2'-aminophenyl)-2,1,3-benzotriazole, which is equivalent to a yield of 73% of theory.

EXAMPLE 2

This example illustrates a series of runs in which the reaction medium is reused thereby obviating the necessity of recovering cupric and ammonium chlorides.

Into an autoclave are charged 60 parts of water, 90 parts of anhydrous ammonia, 31.5 parts of ammonium chloride, 17.1 parts of cupric chloride and 19 parts of a mixture of 2,2'-dichloroazobenzene and 2,2'-dichloroazoxybenzene in a 3:1 mole ratio. The charge is heated to 180° C. and agitated at autogenous pressures of 1360 to 1460 p.s.i. for 8 hours, cooled to room temperature and filtered. The solid residue, 14.6 parts, contains 67% 2-(2'-aminophenyl)-2,1,3-benzotriazole, which is equivalent to 63% of theory.

The aqueous filtrate is analyzed for Cu, chloride ion and ammonia content. The amounts of these components are adjusted to the same level as used above by adding 2.4 parts of cupric chloride, 6 parts of ammonium chloride, 5.2 parts of water and 72.5 parts of ammonia. To the fortified aqueous filtrate are added 19 parts of the dichloroazobenzene-dichloroazoxybenzene mixture and the combined mixture is heated for 8 hours at 180° C. The autogenous pressure is 1300 to 1400 p.s.i. Upon filtration 14.5 parts of a solid product is obtained which contains 67.5% 2-(2'-aminophenyl) - 2,1,3 - benzotriazole for a 63% of theory yield.

The aqueous filtrate obtained from the second reaction is adjusted by adding 1.2 parts of cupric chloride, 2.3 parts of ammonium chloride, 60 parts of ammonia and 19 parts of the dichloroazobenzene-dichloroazoxybenzene mixture and again recycled in the process. After heating for 6 hours at 180° C., autogenous pressures of 1200 to 1300 p.s.i. develop and 14.5 parts of reaction product is recovered on filtration. The analysis indicates 78% purity, which is equivalent to a 73% of theory yield.

EXAMPLE 3

Ths example illustrates the use of varying amounts of cupric chloride in combination with ammonium chloride.

In these experiments, mixtures of 25 parts of 2,2'-dichloroazobenzene, 10.5 parts of ammonium chloride, 80 parts of water and 120 parts of anhydrous ammonia are heated in a closed vessel for 8 hours at 180° C. with the amount of cupric chloride and result indicated below.

| Run | Mole cupric chloride/mole dichloroazobenzene | Yield, percent of theory |
|---|---|---|
| a | 0.002 | 29 |
| b | 0.01 | 36 |
| c | 0.2 | 52 |
| d | 0.66 | 67 |

EXAMPLE 4

This example shows that the addition of ammonium chloride increases the yield of aminophenylbenzotriazole.

A mixture containing 25 parts of 2,2'-dichloroazobenzene, 3.8 parts of cupric oxide, 2.5 parts of cupric chloride, 21 parts of ammonium chloride, 80 parts of water and 120 parts of anhydrous ammonia is heated in a closed vessel for 8 hours at 180° C. From the reaction mixture 19 parts of a crude brown product is obtained which contains 12.2 parts of 2-(2'-aminophenyl)-2,1,3-benzotriazole, which is equivalent to 58% of theory.

When the above reaction is repeated except that the ammonium chloride is omitted, a 48% yield is obtained.

The above reaction may be repeated using 2,2'-dichloro-5,5'-dimethylazobenzene in place of the 2,2'-dichloroazobenzene to give substantially the same yield of 2-(2'-amino-5'-methylphenyl)-5-methyl-2,1,3-benzotriazole.

EXAMPLE 5

This example illustrates the use of various metal ions and diluents.

A mixture of 25 parts of 2,2'-dichloroazobenzene (0.1 mole), 2.5 parts of anhydrous cupric chloride, 10.6 parts of ammonium chloride, 8 parts of water and 120 parts of anhydrous ammonia is heated for 8 hours at 180° C. in a closed vessel. The reaction mass is cooled and filtered. A yield of 43% of 2-(2'-aminophenyl)-2,1,3-benzotriazole is obtained.

The addition of 0.05 mole of either cupric oxide, vanadium pentoxide or m-nitrobenzene sodium sulfonate increased the yield to 55 to 57% of theory. Essentially the same yield is obtained by adding 0.1 mole of nitrobenzene or manganese dioxide.

EXAMPLE 6

This example illustrates the use of various diluents.

A mixture of 50 parts of 2,2'-dichloroazobenzene, 6.3 parts of cupric chloride hydrate, 85 parts of anhydrous ammonia, 57 parts of water and 80 parts of ethylene glycol is heated in a closed vessel for 8 hours at 190° C. The reaction product, 33 parts, is isolated by dilution with water and filtration. The reaction product contains 65.5% 2-(2'-aminophenyl)-2,1,3-benzotriazole, which is equivalent to 52% of theory.

When the ethylene glycol in above reaction is replaced with isopropanol, ethylene glycol ethyl ether, formamide, acetamide or N-methylpyrrolidone, essentially the same yield is obtained. Other solvents such as toluene, dimethylformamide, and N-methylcaprolactam give slightly lower yields.

EXAMPLE 7

This example illustrates the effect of using varying amounts of cuprous chloride without ammonium chloride.

A mixture of 25 parts of 2,2'-dichloroazobenzene, 270 parts of 29% aqueous ammonia and 2 parts of cuprous chloride is heated for 8 hours at 190° C. in a Hastelloy C pressure vessel. A pressure of 650 p.s.i. develops on heating. The reaction product is cooled and filtered from the ammonia at room temperature to give 16 parts of a low melting dark solid. On recrystallization from cyclohexane and again from aqueous methanol, 6 parts of slightly impure 2-(2'-aminophenyl)-2,1,3-benzotriazole, melting at 92° C., is obtained, which is equivalent to a yield of 28% of theory.

When the above reaction is repeated with 5 parts of cuprous chloride, a yield of 32% of 2-(2'-aminophenyl)-2,1,3-benzotriazole melting at 94° C. is obtained.

EXAMPLE 8

This example illustrates the process at atmospheric pressure using an ammonia-generating compound.

A mixture of 50 parts of dichloroazobenzene, 100 parts of dimethylformamide, 96 parts of urea and 19.4 parts of cupric oxide is heated at 160° to 170° C. for 22 hours. The temperature is then raised and 40 parts of dimethylformamide distill off at temperatures up to 200° C. The reaction product obtained on pouring the hot reaction mass into water and filtering contains an amount of 2-(2'-aminophenyl)-2,1,3-benzotriazole equivalent to 38% of theory.

When the dimethylformamide is replaced by N-methylpyrrolidone, formamide or Cellosolve, or omitted entirely, slightly lower yields are obtained.

EXAMPLE 9

This example illustrates a variety of starting materials.

A mixture of 68.2 parts of 2,2'-dibromoazobenzene (M.P. 138° C.), 34 parts of cupric chloride hydrate, 57 parts of water, 80 parts of phenol and 85 parts of anhydrous ammonia is heated for 24 hours at 140° C. in a pressure vessel of Hastelloy C. The reaction mixture consists of two liquid phases, an aqueous top layer and a phenolic bottom layer which contains the reaction product. The product is isolated by diluting the charge with 300 parts of water, adding 250 parts of 30% caustic soda, and filtering the solid product from the aqueous sodium phenolate solution. The yield of 2-(2'-aminophenyl)-2,1,3-benzotriazole is 44% of theory.

Essentially the same results are obtained when the reaction is carried out with 22 parts of cupric chloride hydrate and heated for 4 hours at 190° C. When the 2,2'-dibromoazobenzene in the above reaction is replaced by 2,2'-difluoroazobenzene, 2,2'-difluoroazoxybenzene or 2,2'-difluorohydroazobenzene, lower yields are obtained.

EXAMPLE 10

This example illustrates the use of dichloroazoxybenzene.

A mixture of 53.4 parts of 2,2'-dichloroazoxybenzene, 23.5 parts of cupric chloride hydrate, 80 parts of phenol, 92 parts of water and 85 parts of anhydrous ammonia is heated in a pressure vessel for 8 hours at 140° C. The reaction mass is cooled and filtered. The yield of 2-(2'-aminophenyl)-2,1,3-benzotriazole is 7% of theory and increases to 25% when the reaction is carried out for 16 hours at 140° C.

When the above reaction is carried out for 4 hours at 190° C. using 6.3 parts of cupric chloride hydrate, a yield of 48% of theory is obtained.

EXAMPLE 11

This example illustrates the use of dichlorohydrazobenzene.

A mixture of 25.3 grams of 2,2'-dichlorohydrazobenzene, 270 grams of 29% aqueous ammonia and 2 grams of cuprous chloride is heated in a closed 400 cc. Hastelloy C pressure vessel for 8 hours at 190° C. The reaction product is cooled and filtered from the aqueous ammonia at room temperature. The dark colored reaction product is extracted with hot cyclohexane and then recrystallized from cyclohexane. The light yellow crystals thus obtained melt at 94° to 95° C., show strong fluorescence under ultraviolet light and are identical with a known sample of 2-(2'-aminophenyl)-2,1,3-benzotriazole, as determined by mixed melting points and infrared spectra.

EXAMPLE 12

This example illustrates the process without any water present.

A mixture of 25 parts of 2,2′-dichloroazobenzene, 102 parts of anhydrous ammonia and 2.5 parts of anhydrous cupric chloride is heated for 8 hours at 220° C. in a closed vessel. The reaction mass is cooled and filtered. The yield of 2-(2′-aminophenyl)-2,1,3-benzotriazole is 29% of theory.

EXAMPLE 13

This example illustrates the process without any metal ions present.

A mixture of 25 parts of 2,2′-dichloroazobenzene, 120 parts of anhydrous ammonia, 80 parts of water and 10.5 parts of ammonium chloride is reacted in a closed vessel for 8 hours at 220° C. The reaction mass is cooled and filtered. The reaction product contains 11% of theory of 2-(2′-aminophenyl)-2,1,3-benzotriazole.

The following examples illustrate various methods of purifying the crude aminophenylbenzotriazole product.

EXAMPLE 14

A mixture of 25 parts of 2,2′-dichloroazobenzene, 80 parts of water, 120 parts of anhydrous ammonia, 3.84 parts of cupric oxide and 2.5 parts of cupric chloride is heated for 8 hours at 180° C. in a Hastelloy C pressure vessel. The reaction mass is cooled and the product is filtered a room temperature to give 18.7 parts of crude product.

The crude product is purified by dissolving it in 240 parts of toluene, and passing anhydrous hydrogen chloride into the solution until no further precipitate forms. The hydrochloride of 2-(2′-aminophenyl)-2,1,3-benzotriazole precipitates and is filtered off at 50° C. On drying 19.5 parts of the hydrochloride are obtained. The free benzotriazole is recovered from the hydrochloride by first dissolving it in a mixture of 40 parts of isopropanol and 40 parts of water and then adding 280 parts of water to hydrolyze the salt. The resulting 2-(2′-aminophenyl)-2,1,3-benzotriazole precipitates and is filtered.

The recovered product still contains some o-aminoazobenzene, an orange colored by-product, which is removed by recrystallizing from dilute isopropanol. Pure 2-(2′-aminophenyl)-2,1,3-benzotriazole (10.3 parts) having a melting point of 93° to 94° C. is obtained for a yield of 49% of theory.

EXAMPLE 15

A mixture of 25 parts of 2,2′-dichloroazobenzene, 3.84 parts of cupric oxide, 2.5 parts of cupric chloride, 21.4 parts of ammonium chloride, 80 parts of water and 120 parts of anhydrous ammonia is heated in a pressure vessel for 8 hours at 180° C. The dark colored crude reaction product, 18.8 parts having a purity of 64%, is filtered off.

Five parts of the crude reaction product are purified by dissolving in 80 parts of 15% sulfuric acid at 90° C., then adding 1 part of stannous chloride, which reduces the orange colored impurities. After adding some carbon black, the solution is filtered hot. The 2-(2′-aminophenyl)-2,1,3-benzotriazole sulfate, which crystallizes from the filtrate in almost colorless crystals on cooling, is filtered and washed with 20% sulfuric acid.

A more complete recovery of the product can be obtained if concentrated sulfuric acid is added to the 15% sulfuric acid solution of 2-(2′-aminophenyl)-2,1,3-benzotriazole obtained above in an amount sufficient to increase the acid concentration to about 20 to 40%. The 2-(2′-aminophenyl)-2,1,3-benzotriazole sulfate is less soluble at high sulfuric acid concentrations up to about 70% at which point it starts to become more soluble again.

The free 2-(2′-aminophenyl)-2,1,3-benzotriazole is recovered from the sulfate salt by adding it to water which hydrolyzes the salt, leaving only a small amount in solution. A complete recovery of the product is obtained by neutralizing the residual acid with caustic soda at room temperature, although other bases such as ammonia or sodium carbonate can also be used at temperatures up to about 100° C. Above 90° C. the product tends to melt and separate in the form of beads. The purified product, 3.2 parts, is obtained as a light tan colored product melting at 95° C., which indicates an overall yield of 57% of theory.

In place of the stannous chloride, a solution of 2 parts of titanium trichloride in 10 parts of water or iron in the form of iron filings or borings may be used. When iron is used for the destruction of colored by-products, it is added in small portions to the hot solution of the crude product in 15% sulfuric acid until all the orange colored by-products are reduced as determined by either vapor phase or thin layer chromatography.

EXAMPLE 16

A mixture of 60 parts of 2,2′-dichloroazobenzene, 13.4 parts of anhydrous cupric chloride, 83 parts of water, 96 parts of phenol and 102 parts of anhydrous ammonia is heated for 6 hours at 160° to 170° C. An autogenous pressure of 840 p.s.i. develops in the stainless steel vessel. The reaction product consists of two liquid phases, an aqueous top layer containing most of the copper salts and ammonia, and a bottom organic layer containing practically all the organic reaction products and the phenol.

Addition of 250 parts of 30% aqueous caustic soda solution, either to the total reaction mixture or to the organic layer precipitates 50 parts of a crystalline reaction product which contains 29 parts of 2-(2′-aminophenyl)-2,1,3-benzotriazole, 11 parts of o-aminoazobenzene, 3 parts of 2-phenyl-2,1,3-benzotriazole as well as minor quantities of unidentified by-products.

Pure 2-(2′-aminophenyl)-2,1,3-benzotriazole can be obtained from the above organic layer by a combination of alkaline zinc reduction and sulfuric acid extraction in the following manner. The organic layer containing the crude reaction product is diluted with 50 parts of water and 25 parts of zinc dust is added over a 0.5 hour period at a temperature of 70±10° C. The reaction mixture is cooled to 30° C. and a solution containing 50 parts of sodium hydroxide dissolved in 300 parts of water is added. The resulting granular precipitate containing some zinc oxide and the desired reaction product completely free of o-aminobenzene is filtered.

This product is further purified by extracting with 900 parts of 15% sulfuric acid at 95° to 100° C. The solution is clarified hot and on cooling most of the 2-(2′-aminophenyl)-2,1,3-benzotriazole sulfate crystallizes. A small amount of dissolved product sulfate is recovered from the sulfuric acid filtrate by increasing the sulfuric acid concentration to 40% in which the product sulfate is practically insoluble. The purity of the 2-(2′-aminophenyl)-2,1,3-benzotriazole recovered by filtering the sulfuric acid solution, slurrying the residue in water and neutralizing with an alkali is 98 to 99%.

By following the process of this invention, an economical method is provided for the manufacture of 2-(2′-aminophenyl) - 2,1,3 - benzotriazole. The inexpensive, readily available o-halonitrobenzenes, especially o-chloronitrobenzene, are easily converted to the hydrazo-, azo- or azoxy-benzene starting materials. The process is simple and easy to operate. A further advantage is in the several purification procedures which produce the desired product in a high degree of purity.

Although the invention has been described and exemplified by way of specific embodiments, it is to be understood that it is not limited thereto. As will be apparent to those skilled in the art, numerous modifications and variations of the embodiment illustrated above may be made without departing from the spirit of the invention or the scope of the following claims.

The embodiments of the invention in which an exclusive property or privilege is claimed are defined as follows:

1. A process for the manufacture of 2-(2′-aminophenyl)-2,1,3-benzotriazoles which comprises reacting a dihalo-compound of the formula:

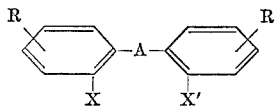

wherein A is an azo, hydrazo or azoxy group; X and X′ are fluorine, chlorine, bromine or iodine and both R's are hydrogen or methyl, with at least 4 moles of ammonia per mole of dihalo-compound at a temperautre of at least 100° C.

2. The process of claim 1 in which both R's are hydrogen and the temperature is 100° to 250° C.

3. The process of claim 2 in which the dihalo-compound is agitated with 15 to 30 moles of 5 to 95% aqueous ammonia per mole of dihalo-compound at a temperature of 150° to 230° C.

4. The process of claim 3 in which the reaction is carried out in the presence of copper, iron, cobalt, chromium, manganese, vanadium or nickel ions.

5. The process of claim 4 in which the reaction is carried out at 160° to 200° C. in the presence of cupric ions.

6. The process of claim 1 in which the product is purified by treating with a mineral acid to form the aminophenylbenzotriazole acid salt, separating the solid acid salt from the phenylbenzotriazole impurity, and hydrolizing the acid salt to obtain the aminophenylbenzotriazole.

7. The process of claim 6 in which both R's are hydrogen.

8. The process of claim 7 in which the mineral acid treating step is carried out by dissolving the crude product in an inert organic solvent and passing hydrogen chloride into the solution.

9. The process of claim 7 in which the mineral acid is 8 to 20% aqueous sulfuric acid.

10. The process of claim 7 in which the product is purified by also treating with a metal reducing agent at elevated temperature to destroy the aminoazobenzene impurity.

11. The process of claim 10 in which the aminoazobenzene impurity is destroyed by treating with stannous chloride, titanium trichloride, titanous sulfate or iron at 80° to 100° C.

12. The process of claim 10 in which the aminoazobenzene impurity is destroyed by treating with zinc or sodium hydrosulfite at 60° to 100° C.

References Cited

UNITED STATES PATENTS

| | | | |
|---|---|---|---|
| 3,148,179 | 9/1964 | Carboni | 260—308 |
| 3,153,048 | 10/1964 | Thatcher | 260—308 |
| 3,272,891 | 9/1966 | Milionis et al. | 260—308 |

OTHER REFERENCES

Wagner et al.: Synthetic Organic Chemistry (New York, 1953), pages 665–666.

ALTON D. ROLLINS, Primary Examiner

U.S. Cl. X.R.

260—143, 205, 569

UNITED STATES PATENT OFFICE
CERTIFICATE OF CORRECTION

Patent No. 3,547,941　　　　　　　　　Dated December 15, 1970

Inventor(s) Josef Pikl

It is certified that error appears in the above-identified patent and that said Letters Patent are hereby corrected as shown below:

Column 9, line 28, "160° to 200° C." should read -- 170° to 200° C. --.

Signed and sealed this 17th day of August 1971.

(SEAL)
Attest:

EDWARD M. FLETCHER, JR.　　　　　　　WILLIAM E. SCHUYLER, J
Attesting Officer　　　　　　　　　　Commissioner of Patent

FORM PO-1050 (10-69)